US012792037B2

(12) United States Patent
Gagliano et al.

(10) Patent No.: US 12,792,037 B2
(45) Date of Patent: *Nov. 10, 2026

(54) METHOD FOR REMOTE STOP OF A VEHICLE

(71) Applicant: Kodiak Robotics, Inc., Mountain View, CA (US)

(72) Inventors: Joseph Gagliano, Santa Clara, CA (US); Court Scott Hinricher, Pacifica, CA (US)

(73) Assignee: Kodiak Robotics, Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/062,968

(22) Filed: Dec. 7, 2022

(65) Prior Publication Data

US 2024/0192683 A1 Jun. 13, 2024

(51) Int. Cl.

| | |
|---|---|
| ***G05D 1/221*** | (2024.01) |
| ***G05D 1/00*** | (2024.01) |
| ***G05D 1/222*** | (2024.01) |
| ***G05D 1/224*** | (2024.01) |

(52) U.S. Cl.

CPC ......... *G05D 1/0077* (2013.01); *G05D 1/0016* (2013.01); *G05D 1/221* (2024.01); *G05D 1/222* (2024.01); *G05D 1/224* (2024.01)

(58) Field of Classification Search

None

See application file for complete search history.

(56) References Cited

U.S. PATENT DOCUMENTS

| | | | | |
|---|---|---|---|---|
| 3,646,515 | A | 2/1972 | Vodehnal | |
| 4,845,463 | A | 7/1989 | Didier | |
| 9,098,080 | B2 | 8/2015 | Norris | |
| 2001/0056544 | A1 | 12/2001 | Walker | |
| 2007/0198145 | A1 | 8/2007 | Norris et al. | |
| 2009/0158790 | A1 | 6/2009 | Oliver | |
| 2009/0232668 | A1 | 9/2009 | Sabelstrom | |
| 2010/0125398 | A1* | 5/2010 | Headlee | B60T 13/586 180/65.265 |
| 2012/0018240 | A1* | 1/2012 | Grubaugh | B62D 51/02 701/70 |
| 2014/0041973 | A1 | 2/2014 | Zula et al. | |
| 2014/0097667 | A1 | 4/2014 | Backes, III | |

(Continued)

OTHER PUBLICATIONS

U.S. Appl. No. 18/062,942, filed Dec. 7, 2022.
U.S. Appl. No. 18/062,954, filed Dec. 7, 2022.
U.S. Appl. No. 18/062,964, filed Dec. 7, 2022.
Notice of Allowance dated Jan. 7, 2025, directed to U.S. Appl. No. 18/062,942; 9 pages.

(Continued)

*Primary Examiner* — Jennifer M Anda
(74) *Attorney, Agent, or Firm* — Michele V. Frank; Venable LLP

(57) ABSTRACT

A method for remotely stopping a vehicle configured to operate autonomously or semi-autonomously. The method includes providing a remote stop system, applying a control signal to the vehicle with the remote stop system, observing an errant behavior of the vehicle, and actuating the remote stop system after observing the errant behavior. The method includes ceasing applying the control signal based on actuating the remote stop system. The method includes stopping the vehicle due to actuating the remote stop system. Actuating the remote stop system, and thus, causing the vehicle to stop, occurs at a location exterior to the vehicle.

20 Claims, 5 Drawing Sheets

(56) References Cited

U.S. PATENT DOCUMENTS

| | | | | |
|---|---|---|---|---|
| 2016/0139594 | A1 | 5/2016 | Okumura | |
| 2017/0267221 | A1 | 9/2017 | Hecker | |
| 2017/0297543 | A1* | 10/2017 | Miura | B60K 28/04 |
| 2017/0341197 | A1 | 11/2017 | Elsmark | |
| 2019/0137999 | A1* | 5/2019 | Taguchi | G05D 1/249 |
| 2019/0202421 | A1 | 7/2019 | Healy | |
| 2020/0110402 | A1 | 4/2020 | Golgiri | |
| 2020/0291608 | A1* | 9/2020 | Ready-Campbell | E02F 9/205 |
| 2021/0116907 | A1 | 4/2021 | Altman | |
| 2021/0362718 | A1* | 11/2021 | Ikenori | B60T 7/22 |
| 2022/0128989 | A1 | 4/2022 | Ghorbanian-Matloob | |
| 2022/0174867 | A1 | 6/2022 | McCutcheon, IV | |
| 2022/0266862 | A1 | 8/2022 | Bybee | |
| 2022/0404827 | A1 | 12/2022 | Hagerskans | |
| 2024/0017701 | A1 | 1/2024 | Van Thiel | |
| 2024/0190399 | A1 | 6/2024 | Gagliano | |
| 2024/0190401 | A1 | 6/2024 | Gagliano | |

OTHER PUBLICATIONS

Non-Final Rejection dated Aug. 21, 2024, directed to U.S. Appl. No. 18/062,942; 13 pages.
Non-Final Rejection dated Feb. 14, 2025, directed to U.S. Appl. No. 18/062,964; 45 pages.
Non-Final Rejection dated Mar. 24, 2025, directed to U.S. Appl. No. 18/062,954; 16 pages.
Notice of Allowance dated Apr. 16, 2025, directed to U.S. Appl. No. 18/062,942; 8 pages.
Notice of Allowance dated Jul. 14, 2025, directed to U.S. Appl. No. 18/062,954; 8 pages.
Final Rejection dated Sep. 2, 2025, directed to U.S. Appl. No. 18/062,964; 45 pages.
Notice of Allowance dated Nov. 4, 2025, directed to U.S. Appl. No. 18/062,954; 10 pages.
Non-Final Rejection dated Mar. 17, 2026, directed to U.S. Appl. No. 18/062,964; 47 pages.
Notice of Allowance dated May 7, 2026 directed to U.S. Appl. No. 18/062,942; 10 pages.

* cited by examiner

METHOD FOR REMOTE STOP OF A VEHICLE

This application is related to U.S. patent application Ser. No. 18/062,942, filed Dec. 7, 2022, U.S. patent application Ser. No. 18/062,954, filed Dec. 7, 2022, and U.S. patent application Ser. No. 18/062,964, filed Dec. 7, 2022, the contents of each of which are incorporated by reference in their entireties.

TECHNICAL FIELD

The present disclosure relates to a remote stop system for a vehicle.

BACKGROUND

Vehicles may be operated autonomous or semi-autonomously. Control systems may be employed to control operation of the vehicle.

BRIEF SUMMARY

According to an embodiment of the present disclosure, a remote stop system for a vehicle configured to be operated autonomously or semi-autonomously includes a remote stop controller configured to be installed on the vehicle and a remote stop actuator configured to send a wireless control signal to the remote stop controller. The remote stop actuator having two states: a first state having the remote stop actuator transmitting the wireless control signal to the remote stop controller and a second state having the remote stop actuator without transmitting the wireless control signal to the remote stop controller. In the second state, an engine of the vehicle is automatically stopped simultaneously with applying a braking force to the vehicle.

According to an embodiment of the present disclosure, a vehicle system includes a vehicle configured to be operated autonomously or semi-autonomously and a remote stop system. The remote stop system has two states: a first state having the remote stop system continuously transmitting a wireless control signal to the vehicle and a second state having the remote stop system without transmitting the wireless control signal to the vehicle, wherein, in the second state, an engine of the vehicle is automatically stopped simultaneously with applying a braking force to the vehicle.

According to an embodiment of the present disclosure, a method for remotely stopping a vehicle configured to operate autonomously or semi-autonomously. The method includes providing a remote stop system, applying a control signal to the vehicle with the remote stop system, observing an errant behavior of the vehicle, actuating the remote stop system after observing the errant behavior, ceasing applying the control signal based on actuating the remote stop system and stopping the vehicle due to actuating the remote stop system. Actuating the remote stop system, and thus, causing the vehicle to stop, occurs at a location exterior to the vehicle.

BRIEF DESCRIPTION OF THE DRAWINGS

The foregoing and other features and advantages will be apparent from the following, more particular, description of various exemplary embodiments, as illustrated in the accompanying drawings, wherein like reference numbers generally indicate identical, functionally similar, and/or structurally similar elements.

DETAILED DESCRIPTION

Various embodiments are discussed in detail below. While specific embodiments are discussed, this is done for illustration purposes only. A person skilled in the relevant art will recognize that other components and configurations may be used without departing from the spirit and scope of the present disclosure.

As used herein, the terms "first," "second," and "third" may be used interchangeably to distinguish one component from another and are not intended to signify location or importance of the individual components.

The terms "coupled," "fixed," "attached," "connected," and the like, refer to both direct coupling, fixing, attaching, or connecting as well as indirect coupling, fixing, attaching, or connecting through one or more intermediate components or features, unless otherwise specified herein.

The singular forms "a," "an," and "the" include plural references unless the context clearly dictates otherwise.

The remote stop system of the present disclosure provides a system for stopping an uncontrollable self-driving (e.g., autonomous or semi-autonomous) vehicle. The remote stop system of the present disclosure is an independent emergency stop system that will turn off the vehicle engine and apply brakes, bringing the vehicle to a stop when commanded. The remote stop system of the present disclosure removes power from the engine PCIe connection (i.e., Peripheral Component Interconnect Express), causing the vehicle to coast freely. At the same time, the remote stop system of the present disclosure applies brakes by actuating a brake valve. The remote stop system of the present disclosure is resettable. The remote stop system of the present disclosure employs reliable components that ensure the vehicle system will be brought to a stop when errant behavior is observed. The remote stop system of the present disclosure is independent of the autonomous vehicles computer systems and control systems. That is, the remote stop system of the present disclosure operates with systems, computers, and components that are not tied to the autonomous operation of the vehicle. For example, the controllers and computers relied upon to effectuate the remote stop are not the same controllers and computers relied upon to autonomous operate the vehicle. In this manner, the remote stop system is allowed to control stoppage of the vehicle independently of the health status of the vehicle. Therefore, the remote stop system of the present disclosure provides an advantageous safe guard for autonomous vehicles and semi-autonomous vehicles that do not have an operator on board driving the vehicle in order to perform the functions performed by the remote stop system of the present disclosure.

The remote stop system of the present disclosure is described in more detail when referring to FIGS. 1 to 4.

Figure 1:
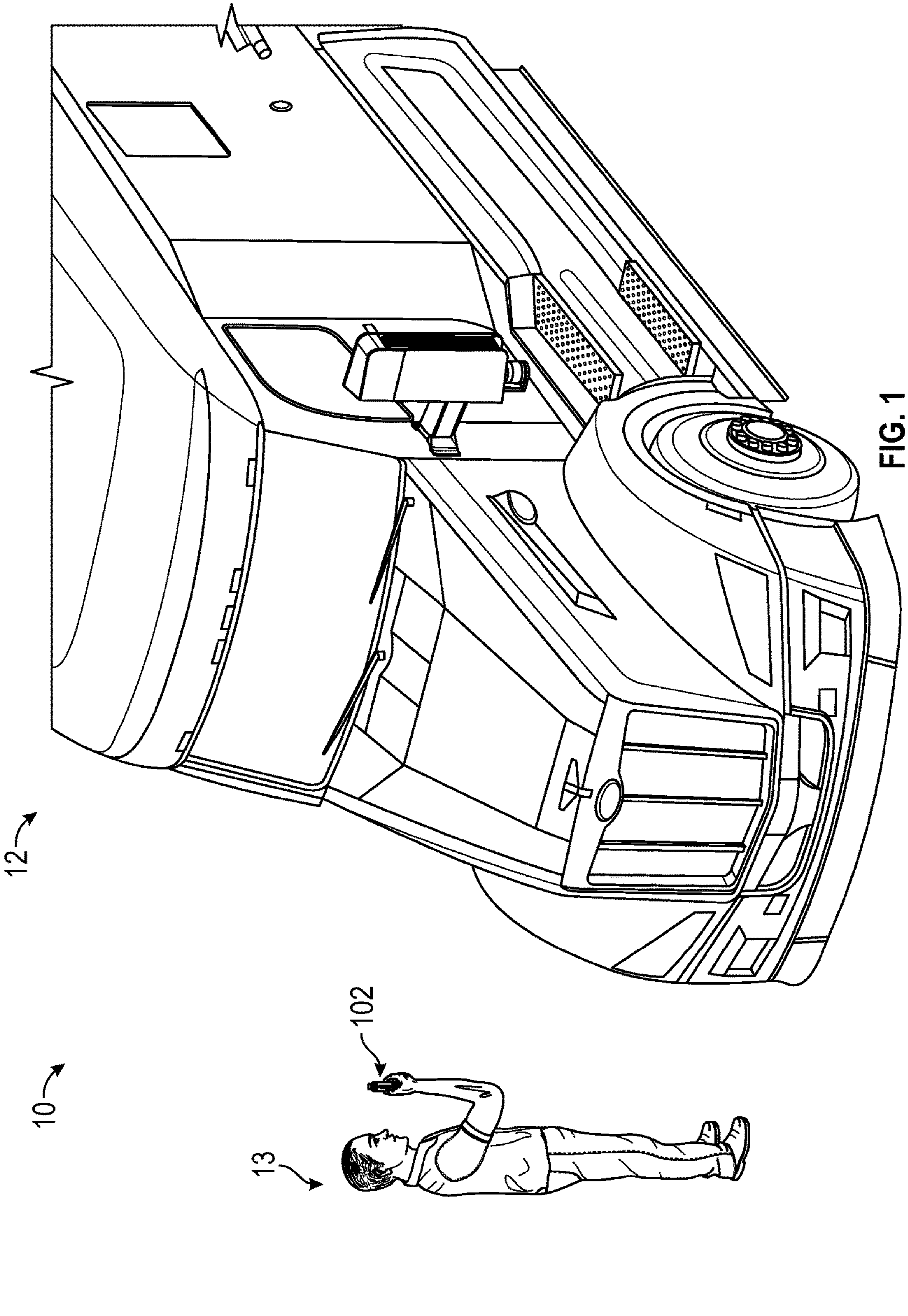
FIG. 1 illustrates a schematic view of a vehicle system having a remote stop system, according to an embodiment of the present disclosure.
Figure 2:
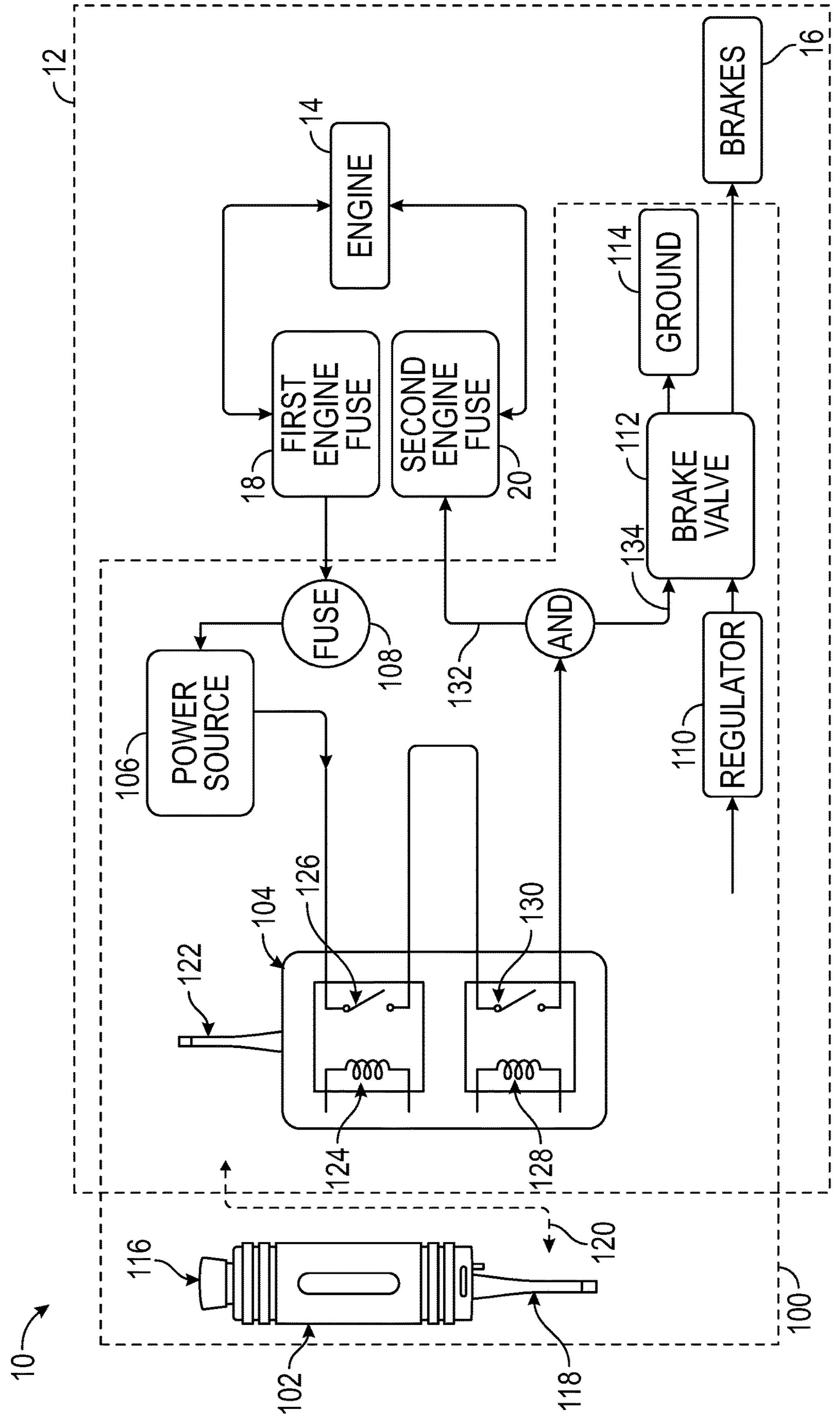
FIG. 2 illustrates a schematic view of the vehicle system of FIG. 1, according to an embodiment of the present disclosure.

Referring first to FIGS. 1 and 2, a vehicle system 10 includes a vehicle 12 having a remote stop system 100. The vehicle 12 may be an autonomous or semi-autonomous vehicle. The vehicle 12 may be any autonomous or semi-autonomous motor vehicle, such as, for example, but not limited to a car, a truck, a commercial truck, a semitrailer or semi-truck, a bus, a watercraft, a motorcycle, an aircraft, or a spacecraft. The vehicle 12 is shown schematically in FIG. 2. As shown, the vehicle 12 includes an engine 14 and brakes 16. The engine 14 includes a first engine fuse 18, also referred to as a first power pass-through 18 and a second engine fuse 20, also referred to as a second power pass-through 20. The second engine fuse 20 may include a PCIe for control of the engine 14. The vehicle 12 is equipped with a portion of the remote stop system 100, as will be described to follow. The remote stop system 100 includes a remote stop actuator 102 and a remote stop controller 104. The remote stop system 100 includes a power source 106 and a fuse 108. The power source 106 may be a 12 volt power input and the fuse 108 may be a 10 Amp fuse. The fuse 108 reduces the power supply from the vehicle 12 main power source to allow the power to be provided to the power source 106 for use in the remote stop system 100. Additionally, the remote stop system 100 includes a pressure regulator 110, a brake valve 112, and a ground 114.

Referring to FIGS. 1 and 2, an external operator 13 possesses a portion of the remote stop system 100, while the remainder of the remote stop system 100 is located on the vehicle 12. That is, the external operator 13 possesses the remote stop actuator 102, while the remote stop controller 104, the power source 106, the fuse 108, the pressure regulator 110, the brake valve 112, and the ground 114 are located on the vehicle 12. Accordingly, as described in more detail to follow, the external operator 13 observes the vehicle 12. When it is desired to stop the vehicle 12 (either due to errant behavior or otherwise), the external operator 13 activates the remote stop actuator 102 to remotely stop the vehicle 12.

With continued reference to FIG. 2, the remote stop system 100 and the vehicle 10 are shown schematically. As may be appreciated, the features within the dashed vehicle 12 are schematic representations of features installed on the vehicle 12 of FIG. 1. As mentioned, the remote stop system 100 includes the remote stop actuator 102. The remote stop actuator 102 includes an actuator 116 and a transmitter 118. In some examples, the actuator 116 is a push button. That is, the actuator 116 may be depressed to initiate actuation of the remote stop system 100 and may be released to cease actuation of the remote stop system 100. A push button is just one example, other known actuators are contemplated. The transmitter 118 may transmit a control signal from the remote stop actuator 102 to the remote stop controller 104. The transmission of the control signal from the remote stop actuator 102 to the remote stop controller 104 occurs in the normal operation of the vehicle 12, that is, prior to activation of the remote stop system 100 to stop the vehicle 12. Accordingly, when the actuator 116 is activated, the actuator 116 causes the control signal to cease transmission (e.g., to no longer be emitted from the transmitter 118). For example, the control signal may be established between the remote stop actuator 102 and remote stop controller 104 in a set up phase of the remote stop system 100. Then, if the control signal or link is disconnected or if the actuator 116 is pushed or activated, then the remote stop system 100 will activate to stop the vehicle 12. The control signal may transfer over a wireless connection 120 to the remote stop controller 104. In some examples, the wireless connection 120 is a radiofrequency (RF) connection, though other wireless and wired connections are contemplated, such as, for example, Wi-Fi, Bluetooth® (e.g., short range wireless), etc. The control signal from the remote stop actuator 102 may initiate the remote stop of the vehicle 12.

The wireless connection 120 may allow for the control signal to transmit over a large distance. Accordingly, as the vehicle 12 is operated over a test track, for example, an operator may follow the vehicle 12 while in possession of and/or holding the remote stop actuator 102. When the operator witnesses or observes behavior of the vehicle 12 that is outside of predetermined parameters, the operator may actuate the remote stop actuator 102 to send the signal to the remote stop controller 104 onboard the vehicle 12.

The remote stop controller 104 may include a receiver 122 for receiving the control signal from the transmitter 118 of the remote stop actuator 102. The remote stop controller 104 includes a first control circuit 124 having a first switch 126 and a second control circuit 128 having a second switch 130. The first control circuit 124 and the second control circuit 128 are arranged in series such that there is a redundancy in the system. That is, if there is failure of one of the first switch 126 or the second switch 130, remote stop of the vehicle 12 the remote stop system 100 will be activated to stop the vehicle 12. This built in redundancy in the system ensures reliability of the remote stop system 100 by allowing activation of the system (and thus stoppage of the vehicle 12) if any connection is broken within the circuit, regardless of whether an operator initiated the actuator 116. Therefore, more or fewer than two control circuits and two switches is contemplated. When the control signal is received by the receiver 122, the first switch 126 and the second switch 130 are caused to open to detach the first control circuit 124 and the second control circuit 128 from the power source 106, as is described in more detail below.

During operation, and referring to FIGS. 1 and 2, the transmitter 118 of the remote stop actuator 102 continuously (e.g., for the entirety of the transmitting period) sends a control signal, across the wireless connection 120, to the receiver 122 of the remote stop controller 104. When the operator 13 desires to remotely stop the vehicle 12, the operator 13 activates the actuator 116 of the remote stop actuator 102 (e.g., depresses the actuator 116). The activation of the actuator 116 causes the control signal to cease to be transmitted from the remote stop actuator 102 to the remote stop controller 104, thus causing the first switch 126 and the second switch 130 to open. When the control signal is ceased to be transmitted, the engine is automatically turned off and the braking actuation is activated. That is, the engine signal 132 ceases causing the engine 14 to stop and/or lose power and the braking signal 134 ceases causing the brakes 16 to be actuated. With the engine halted, further motion of the vehicle 12 is prevented. With the brakes 16 actuated, the brakes 16 apply a stopping force to the vehicle 12. The stopping force actively causes the vehicle 12 to stop or cease moving. The cessation of power to the engine 14 and the application of a braking force by the brakes 16 may occur simultaneously.

Figure 3:
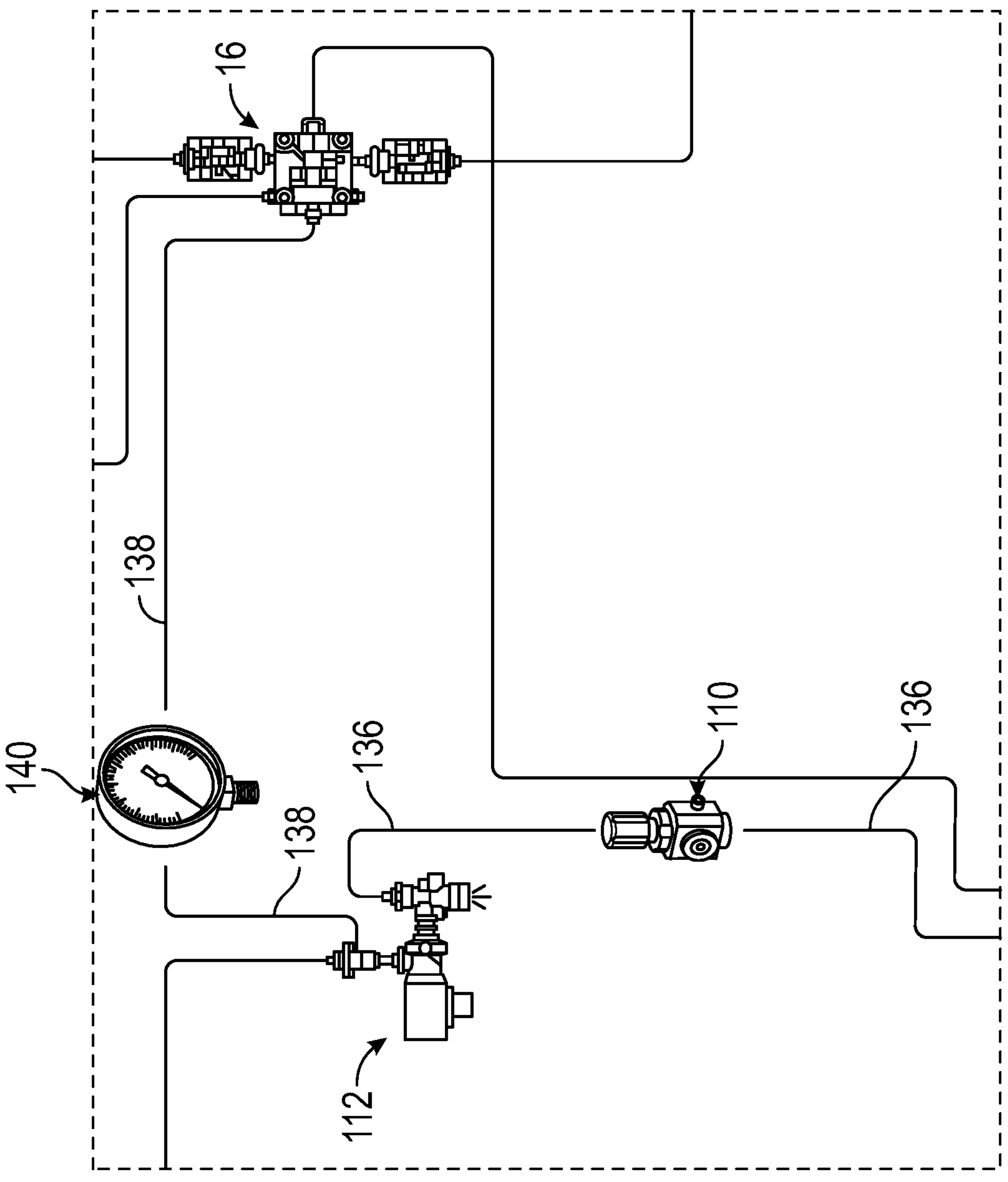
FIG. 3 illustrates a schematic view of a brake system for the vehicle system of FIG. 1, according to an embodiment of the present disclosure.

Referring to FIGS. 2 and 3, activation of the brakes 16 is now explained. The brake valve 112 is in a normally closed condition. That is, during operation of the vehicle 12 and when the remote stop system 100 is not actuated, the brake valve 112 is closed. The cessation of the braking signal 132 causes the brake valve 112 to open. With the brake valve 112 open, air pressure from the vehicle 12 flows through line 136, through the brake valve 112, through line 138, and to the brakes 16 to apply a braking force to the vehicle 12. The pressure regulator 110 is fluidly coupled to line 136 such that the air pressure flows through the pressure regulator 110 prior to flowing through the brake valve 112 to the brakes 16. The pressure regulator 110 reduces the air pressure prior to reaching the brakes 16 thus reducing the braking force the brakes 16 apply when the remote stop system 100 is activated. In some examples, a pressure gauge 140 may be coupled to the line 138 to measure the pressure of the air flowing to the brakes 16. The pressure gauge 140 is optional and may be omitted.

Once the vehicle 12 has come to a stop, the actuator 116 is returned to the unactuated position (e.g., by actively raising/twisting the actuator and/or by no longer depressing the actuator, etc.). In the unactuated position, the control signal once again is transmitted from the remote stop actuator 102 to the remote stop controller 104. The first switch 126 and the second switch 130 are caused to close, reconnecting the remote devices (e.g., the remote stop actuator 102 and the remote stop controller 104) via the control signal. As the control signal is now emitted once again from the remote stop actuator 102, the engine 14 may be turned back on (e.g., by an operator or by a remote control) and the brake valve 112 is allowed to be actuated in a normal operating fashion. In other words, when the actuator 116 is reset (e.g., moved from a depressed position to an undepressed position), the signal connection, which was previously severed during actuation of the actuator 116, between the remote stop actuator 102 and the remote stop controller 104 is reestablished allowing for normal operation of the vehicle 12. To restart the engine 14, an operator (which may be the operator 13 or other operator) restarts the engine 14 or the vehicle 12 according to normal operation of the vehicle 12. In some examples, this results in the operator entering the driver side of the vehicle 12 to start the engine. In some examples, restarting the vehicle 12 is performed remotely. The remote stop system 100 may be actuated multiple times as required to stop the vehicle 12. Thus, the process is repeatable as needed by an operator.

Stated another way, and with continued reference to FIGS. 2 and 3, the braking force applied by the brakes 16 to the vehicle 12 are controlled in the following manner. First, before using the remote stop system 100, the pressure regulator 110 is set to allow a predetermined amount of pressure to the brake valve 112. When the remote stop system 100 is activated, the braking signal 134 ceases being sent and the brake valve 112 actuates and releases pressure downstream to the brakes 16. The pressure that flows past the pressure gauge 140 will help determine how much braking force has been applied. The pressure regulator 110 can thus be adjusted, based on the pressure gauge 140 readings, to allow more or less pressure through the system, increasing or decreasing the braking force as needed. For example, based on the particular vehicle 12 in which the remote stop system 100 is installed, the pressure regulator 110 may be adjusted to allow more or less braking force to accommodate the size and/or weight of the vehicle 12. This allows the pressure to be tuned to a predetermined pressure based on a particular vehicle.

Figure 4:
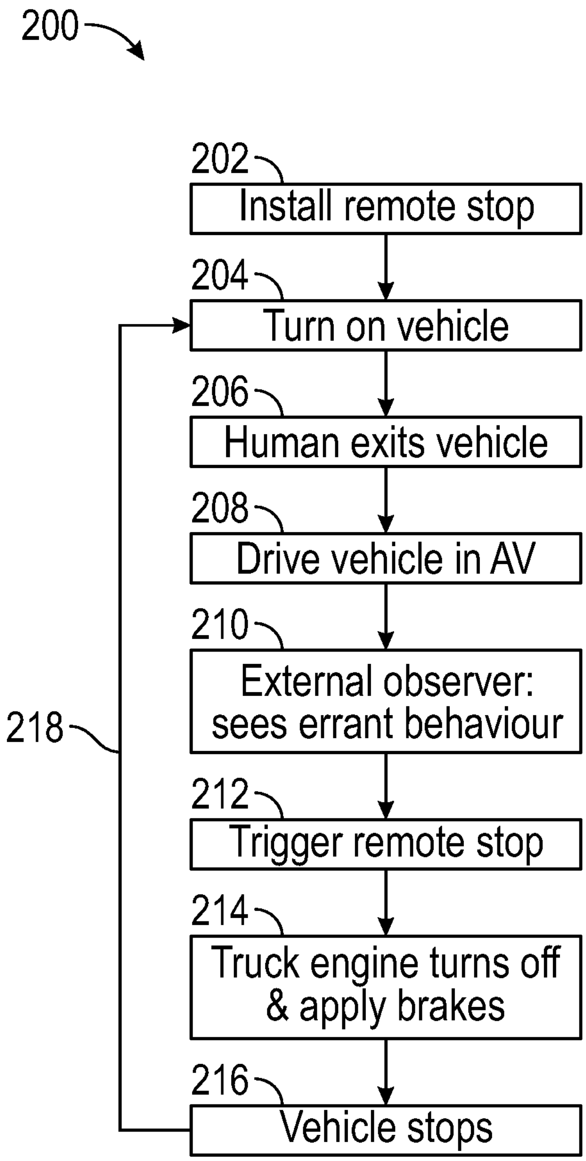
FIG. 4 illustrates a method for stopping the vehicle of FIG. 1 with the remote stop system of FIG. 2, according to an embodiment of the present disclosure.

Referring to FIG. 4, a method 200 for remote stop of a vehicle 12 is shown. In step 202, the remote stop system 100 is installed on the vehicle 12. This includes installation of all the parts identified in FIGS. 1 to 3 as belonging to the remote stop system 100. Once installed, the vehicle 12 is turned on, that is, the engine is started. The vehicle 12 may be started in accordance with the normal function and operation of the vehicle 12, whether that be remote start or an operator starting the vehicle 12. If the vehicle 12 is an autonomous or semi-autonomous vehicle, at step 206, the operator may exit the vehicle 12. Although described herein in the context of autonomous or semi-autonomous vehicles, the vehicle 12 could be a human operated vehicle enabled with the remote stop system 100 such that another operator could remotely stop the vehicle, even with the human in the vehicle 12.

At step 208, the vehicle 12 is operated. As mentioned, this may be autonomous or semi-autonomous operation. In some examples, the operation is conducted as testing of the vehicle 12 and the remote stop system 100 provides a security measure during the testing of the vehicle 12. At step 210, an operator that is external to the vehicle 12 observes the operation of the vehicle 12. The operator may observe errant behavior in the vehicle 12. Errant behavior may include, but is not limited to failure of onboard control systems, the vehicle begins to make an unsafe decision, the vehicle is drifting from a desired line or desired path, an internal fault that may trigger a hazard light, etc. Once the errant behavior is detected by the external operator, the external operator may activate the actuator 116 of the remote stop actuator 102 at step 212. The remote stop actuator 102 then instructs, simultaneously, the vehicle engine to turn off and applies the brakes at step 214, as described previously. The vehicle 12 then comes to a complete stop at 216. As mentioned previously, the engine may be turned back on and the braking force removed such that the process is repeatable. This is shown via line 218, which illustrates that after the vehicle stops at step 216, the vehicle 12 may be turned on at step 204 and the process repeated.

Accordingly, once the remote stop system 100 is installed, an external observer can bring the vehicle 12 to a stop at any time. Although described with respect to errant behavior, the external observer has the ability to stop the vehicle 12 at any time with actuation of the remote stop actuator 102. As discussed previously, the remote stop system removes power from the engine, causing the vehicle 12 to coast, while also applying brakes 16 instantaneously. The vehicle 12 will come to a stop, keeping external operators and property safe.

In some cases, the remote stop system 100 may not be a permanent installation on the vehicle 12. For example, when the vehicle 12 is being tested prior to road use, the remote stop system 100 may be installed on the vehicle 12 to provide a safe guard against errant behavior detected during testing, that will be fixed or adjusted prior to road use. Thus, once the testing is completed, the remote stop system 100 may be removed or uninstalled from the vehicle 12. This includes removal of the remote stop controller 104, the power source 106, the fuse 108, the pressure regulator 110, the brake valve 112, the ground 114, and, if included, the pressure gauge 140.

The external operator, as described herein, may be a human operator, a robotic operator, a watchdog for monitoring vehicle performance, etc. The external operator is any operator that is capable of 1) detecting errant behavior in the vehicle and 2) activating the remote stop system to stop the vehicle.

In order to ensure proper function of the remote stop system and ensure function even during failure or malfunction of vehicle systems (e.g., the vehicle computers), the remote stop system is operated wholly separate from the autonomous operation system of the vehicle. That is, the systems and controls that enable the control signal to transmit from the remote stop actuator to the brakes and engine computer are not the systems and controls that vehicle relies on for autonomous or semi-autonomous operation of the vehicle. Separation of the remote control system and the vehicle control system allow for the vehicle to be remotely stopped even in conditions where the vehicle control system is inoperable or is malfunctioning (e.g., where the errant behavior is caused by the vehicle control system).

Figure 5:
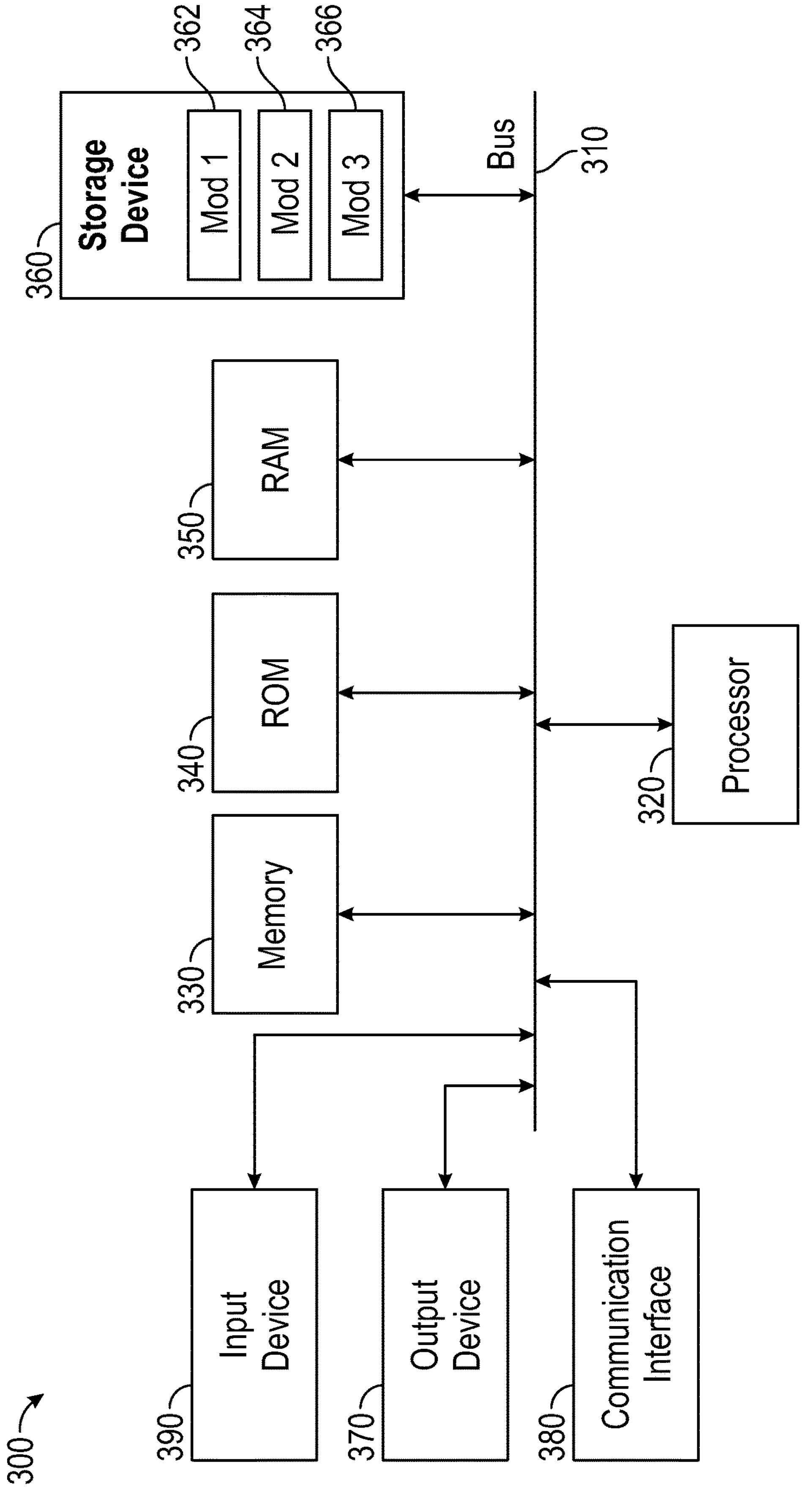
FIG. 5 illustrates a computer system, according to an embodiment of the present disclosure.

In order to effectuate the controls previously described the computers and/or controllers of FIGS. 1 to 4 may be computers as described with respect to FIG. 5. With reference to FIG. 5, an exemplary system includes a general-purpose computing device 300, including a processing unit (CPU or processor) 320 and a system bus 310 that couples various system components including the system memory 330 such as read-only memory (ROM) 340 and random access memory (RAM) 350 to the processor 320. The computing device 300 can include a cache of high-speed memory connected directly with, in close proximity to, or integrated as part of the processor 320. The computing device 300 copies data from the memory 330 and/or the storage device 360 to the cache for quick access by the processor 320. In this way, the cache provides a performance boost that avoids processor 320 delays while waiting for data. These and other modules can control or be configured to control the processor 320 to perform various actions. Other system memory 330 may be available for use as well. The memory 330 can include multiple different types of memory with different performance characteristics. It can be appreciated that the disclosure may operate on a computing device 300 with more than one processor 320 or on a group or cluster of computing devices networked together to provide greater processing capability. The processor 320 can include any general-purpose processor and a hardware module or software module, such as module 1 362, module 2 364, and module 3 366 stored in storage device 360, configured to control the processor 320 as well as a special-purpose processor where software instructions are incorporated into the actual processor design. The processor 320 may essentially be a completely self-contained computing system, containing multiple cores or processors, a bus, memory controller, cache, etc. A multi-core processor may be symmetric or asymmetric.

The system bus 310 may be any of several types of bus structures including a memory bus or memory controller, a peripheral bus, and a local bus using any of a variety of bus architectures. A basic input/output (BIOS) stored in ROM 340 or the like, may provide the basic routine that helps to transfer information between elements within the computing device 300, such as during start-up. The computing device 300 further includes storage devices 360 such as a hard disk drive, a magnetic disk drive, an optical disk drive, tape drive or the like. The storage device 360 can include software modules 362, 364, 366 for controlling the processor 320. Other hardware or software modules are contemplated. The storage device 360 is connected to the system bus 310 by a drive interface. The drives and the associated computer-readable storage media provide nonvolatile storage of computer-readable instructions, data structures, program modules and other data for the computing device 300. In one aspect, a hardware module that performs a particular function includes the software component stored in a tangible computer-readable storage medium in connection with the necessary hardware components, such as the processor 320, system bus 310, output device 370, and so forth, to carry out the function. In another aspect, the system can use a processor and computer-readable storage medium to store instructions which, when executed by a processor (e.g., one or more processors), cause the processor to perform a method or other specific actions. The basic components and appropriate variations are contemplated depending on the type of device, such as whether the device 300 is a small, handheld computing device, a desktop computer, or a computer server.

Although the exemplary embodiment described herein employs the hard disk 360, other types of computer-readable media which can store data that are accessible by a computer, such as magnetic cassettes, flash memory cards, digital versatile disks, cartridges, random access memories (RAMs) 350, and read-only memory (ROM) 340, may also be used in the exemplary operating environment. Tangible computer-readable storage media, computer-readable storage devices, or computer-readable memory devices, expressly exclude media such as transitory waves, energy, carrier signals, electromagnetic waves, and signals per se.

To enable user interaction with the computing device 300, an input device 390 represents any number of input mechanisms, such as a microphone for speech, a touch-sensitive screen for gesture or graphical input, keyboard, mouse, motion input, speech and so forth. An output device 370 can also be one or more of a number of output mechanisms known to those of skill in the art, such as, for example, a display. In some instances, multimodal systems enable a user to provide multiple types of input to communicate with the computing device 300. The communications interface 380 generally governs and manages the user input and system output. There is no restriction on operating on any particular hardware arrangement and therefore the basic features here may easily be substituted for improved hardware or firmware arrangements as they are developed.

The technology discussed herein refers to computer-based systems and actions taken by, and information sent to and from, computer-based systems. One of ordinary skill in the art will recognize that the inherent flexibility of computer-based systems allows for a great variety of possible configurations, combinations, and divisions of tasks and functionality between and among components. For instance, processes discussed herein can be implemented using a single computing device or multiple computing devices working in combination. Databases, memory, instructions, and applications can be implemented on a single system or distributed across multiple systems. Distributed components can operate sequentially or in parallel.

According to an aspect of the present disclosure, a remote stop system for a vehicle configured to be operated autonomously or semi-autonomously includes a remote stop controller configured to be installed on the vehicle and a remote stop actuator configured to send a wireless control signal to the remote stop controller. The remote stop actuator having two states: a first state having the remote stop actuator transmitting the wireless control signal to the remote stop controller and a second state having the remote stop actuator without transmitting the wireless control signal to the remote stop controller. In the second state, an engine of the vehicle is automatically stopped simultaneously with applying a braking force to the vehicle.

The remote stop system the preceding clause, the remote stop actuator further including an actuator configured to be activated by an external operator and a transmitter configured to transmit the wireless control signal.

The remote stop system of any preceding clause, the remote stop controller further including a circuit configured to selectively transmit the wireless control signal to the vehicle.

The remote stop system of any preceding clause, wherein, in the first state the circuit is closed, and in the second state, the circuit is open.

The remote stop system of any preceding clause, the remote stop controller further including a pair of circuits connected in series and configured to selectively transmit the wireless control signal to the vehicle.

The remote stop system of any preceding clause, further including a power source and a switch, wherein the power source is configured to close the switch to permit transmission of the wireless control signal to the vehicle.

The remote stop system of any preceding clause, further including two or more switches, and wherein only a single switch of the two or more switches is required to be open to stop transmission of the wireless control signal to the vehicle.

The remote stop system of any preceding clause, further including a brake valve configured to selectively apply the braking force to the vehicle.

The remote stop system of any preceding clause, the brake valve including an open position and a closed position, wherein the brake valve is in the closed position during operation of the vehicle and in the open position to apply the braking force to the vehicle.

The remote stop system of any preceding clause, wherein the brake valve is configured to move from a closed position to an open position when the remote stop actuator is in the second state.

The remote stop system of any preceding clause, further including a pressure regulator configured to regulate the braking force.

The remote stop system of any preceding clause, further including a pressure gauge configured to monitor a pressure through the brake valve.

The remote stop system of any preceding clause, further including a fuse and a power source, wherein the fuse is configured to reduce a vehicle power to a power level employed by power source, and wherein the power source is configured to open one or more switches of the remote stop system to stop transmission of the wireless control signal from the remote stop actuator to the vehicle.

The remote stop system of any preceding clause, wherein the remote stop actuator continuously transmits the wireless control signal in the first state.

According to an aspect of the present disclosure, a vehicle system includes a vehicle configured to be operated autonomously or semi-autonomously and a remote stop system. The remote stop system has two states: a first state having the remote stop system continuously transmitting a wireless control signal to the vehicle and a second state having the remote stop system without transmitting the wireless control signal to the vehicle, wherein, in the second state, an engine of the vehicle is automatically stopped simultaneously with applying a braking force to the vehicle.

The vehicle system of the preceding clause, the remote stop system further including a remote stop actuator configured to send the wireless control signal.

The vehicle system of any preceding clause, the remote stop actuator further including an actuator configured to be activated by an external operator and a transmitter configured to transmit the wireless control signal.

The vehicle system of any preceding clause, the remote stop system further including a remote stop controller configured to receive the wireless control signal from the remote stop actuator.

The vehicle system of any preceding clause, the remote stop controller further including a circuit configured to selectively transmit the wireless control signal to the vehicle.

The vehicle system of any preceding clause, wherein, in the first state, the circuit is closed, and in the second state, the circuit is open.

The vehicle system of any preceding clause, the remote stop system further including a pair of redundant circuits configured to selectively transmit the wireless control signal to the vehicle.

The vehicle system of any preceding clause, the remote stop system further including a remote stop controller having the pair of redundant circuits.

The vehicle system of any preceding clause, the remote stop system further including a power source and a switch, wherein the power source is configured to close the switch to permit transmission of the wireless control signal to the vehicle.

The vehicle system of any preceding clause, further including two or more switches, and wherein only a single switch of the two or more switches is required to be open to stop transmission of the wireless control signal to the vehicle.

The vehicle system of any preceding clause, the remote stop system further including a brake valve configured to selectively apply the braking force to the vehicle.

The vehicle system of any preceding clause, the brake valve including an open position and a closed position, wherein the brake valve is in the closed position in the first state and in the open position in the second state.

The vehicle system of any preceding clause, the remote stop system further including a pressure regulator configured to regulate the braking force.

The vehicle system of any preceding clause, the remote stop system further including a pressure gauge configured to monitor a pressure through the brake valve.

According to an aspect of the present disclosure, a method for remotely stopping a vehicle configured to operate autonomously or semi-autonomously. The method includes providing a remote stop system, applying a control signal to the vehicle with the remote stop system, observing an errant behavior of the vehicle, actuating the remote stop system after observing the errant behavior, ceasing applying the control signal based on actuating the remote stop system and stopping the vehicle due to actuating the remote stop system. Actuating the remote stop system, and thus, causing the vehicle to stop, occurs at a location exterior to the vehicle.

The method of the preceding clause, wherein providing a remote stop system further includes providing a remote stop actuator to an external operator.

The method of any preceding clause, wherein providing a remote stop system further includes installing a remote stop controller and a brake valve on the vehicle.

The method of any preceding clause, wherein actuating the remote stop system causes one or more switches on the remote stop controller to open.

The method of any preceding clause, wherein providing a remote stop system further includes installing a remote stop controller, a power source, a fuse, a brake valve, and a pressure regulator on the vehicle.

The method of any preceding clause, wherein observing errant behavior of the vehicle occurs at a location exterior to the vehicle.

The method of any preceding clause, wherein observing the errant behavior occurs by an external human operator.

The method of any preceding clause, further including operating the vehicle in an autonomous or semi-autonomous mode before and during observing the errant behavior, wherein actuating the remote stop system stops the autonomous or semi-autonomous operating of the vehicle.

The method of any preceding clause, wherein errant behavior includes one or more of i) failure of onboard control systems, ii) the vehicle begins to make an unsafe decision, iii) the vehicle is drifting from a desired line or desired path, or iv) an internal fault that triggers a hazard light.

The method of any preceding clause, wherein stopping the vehicle further includes ceasing engine operation and applying a braking force.

The method of any preceding clause, wherein ceasing engine operation is simultaneous with applying the braking force.

The method of any preceding clause, wherein ceasing applying the control signal operates the braking force and stops the engine.

The method of any preceding clause, further including, resetting the method after the vehicle stops to allow subsequent actuations of the remote stop system.

The method of any preceding clause, wherein resetting the method includes ceasing actuation of the remote stop system to reestablish the control signal, starting the engine, and removing the braking force.

The method of any preceding clause, wherein actuating the remote stop system occurs multiple times.

The method of any preceding clause, further including opening a brake valve to apply a braking force to the vehicle, wherein opening the brake valve occurs due to actuating the remote stop system.

The method of any preceding clause, further including reducing an air pressure through the brake valve.

The method of any preceding clause, further including monitoring an air pressure through the brake valve.

The method of any preceding clause, further including reducing a power from the vehicle to be used by the remote stop system.

The method of any preceding clause, wherein actuating the remote stop system includes depressing a button on a controller.

Although the foregoing description is directed to the preferred embodiments, it is noted that other variations and modifications will be apparent to those skilled in the art and may be made without departing from the spirit or scope of the disclosure. Moreover, features described in connection with one embodiment may be used in conjunction with other embodiments, even if not explicitly stated above.

The invention claimed is:

1. A method for remotely stopping a vehicle configured to operate autonomously or semi-autonomously comprising:

providing a remote stop system;

transmitting a control signal to the vehicle with the remote stop system, the control signal preventing the remote stop system from stopping the vehicle;

ceasing transmission of the control signal to the vehicle;

actuating the remote stop system based on ceasing transmission of the control signal to the vehicle;

stopping the vehicle with the remote stop system by applying a braking force due to actuating the remote stop system in response to ceasing transmission of the control signal to the vehicle, wherein actuating the remote stop system, and thus, causing the vehicle to stop, occurs at a location exterior to the vehicle.

2. The method of claim 1, wherein providing the remote stop system further comprises providing a remote stop actuator to an external operator.

3. The method of claim 2, wherein providing the remote stop system further comprises providing a remote stop controller and a brake valve on the vehicle.

4. The method of claim 3, wherein actuating the remote stop system causes one or more switches on the remote stop controller to open.

5. The method of claim 2, wherein providing the remote stop system further comprises providing a remote stop controller, a power source, a fuse, a brake valve, and a pressure regulator on the vehicle.

6. The method of claim 1, wherein actuating the remote stop system occurs in response to actuation of a remote stop actuator.

7. The method of claim 1, wherein actuating the remote stop system occurs by an external human operator.

8. The method of claim 1, further comprising operating the vehicle in an autonomous or semi-autonomous mode before actuating the remote stop system, wherein actuating the remote stop system stops the autonomous or semi-autonomous operating of the vehicle.

9. The method of claim 1, wherein the actuating the remote stop system occurs in response to one or more of a failure of onboard control systems, or an internal fault that triggers a hazard light.

10. The method of claim 1, wherein stopping the vehicle further comprises ceasing engine operation of an engine of the vehicle.

11. The method of claim 10, wherein ceasing engine operation is simultaneous with applying the braking force.

12. The method of claim 10, wherein ceasing transmission of the control signal operates the braking force and stops the engine.

13. The method of claim 10, further comprising, resetting the method after the vehicle stops to allow subsequent actuations of the remote stop system.

14. The method of claim 13, wherein resetting the method comprises:

ceasing actuation of the remote stop system to reestablish transmission of the control signal;

starting the engine; and removing the braking force.

15. The method of claim 1, wherein actuating the remote stop system occurs multiple times.

16. The method of claim 1, further comprising opening a brake valve to apply the braking force to the vehicle, wherein opening the brake valve occurs due to actuating the remote stop system.

17. The method of claim 16, further comprising reducing an air pressure through the brake valve.

18. The method of claim 16, further comprising monitoring an air pressure through the brake valve.

19. The method of claim 1, further comprising reducing a power from the vehicle to be used by the remote stop system.

20. The method of claim 1, wherein actuating the remote stop system comprises depressing a button on a controller.

* * * * *